(12) United States Patent
Yamana

(10) Patent No.: US 8,305,477 B2
(45) Date of Patent: Nov. 6, 2012

(54) IMAGE PICKUP APPARATUS, CONTROL METHOD THEREOF, AND PROGRAM

(75) Inventor: Kazuaki Yamana, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 12/877,225

(22) Filed: Sep. 8, 2010

(65) Prior Publication Data
US 2011/0063478 A1 Mar. 17, 2011

(30) Foreign Application Priority Data

Sep. 11, 2009 (JP) ................................. 2009-210859
Nov. 5, 2009 (JP) ................................. 2009-254141

(51) Int. Cl.
*H04N 5/222* (2006.01)
*H04N 5/262* (2006.01)
(52) U.S. Cl. ................. 348/333.02; 348/240.2
(58) Field of Classification Search ............. 348/240.99, 348/240.2, 240.1, 333.02
See application file for complete search history.

(56) References Cited

U.S. PATENT DOCUMENTS

2006/0171703 A1* 8/2006 Abe et al. ...................... 396/311
2007/0279512 A1* 12/2007 Maruyama et al. ...... 348/333.11

FOREIGN PATENT DOCUMENTS

| JP | 2001-094855 | | 4/2001 |
| JP | 2004-032524 | A | 1/2004 |
| JP | 2004-072206 | | 3/2004 |
| JP | 2009-141710 | A | 6/2009 |

OTHER PUBLICATIONS

The above reference was cited in a Jan. 17, 2012 Japanese Office Action, which is not enclosed, that issued in Japanese Patent Application No. 2009-254141.

The above reference was cited in a May 15, 2012 Japanese Office Action, which is not enclosed, that issued in Japanese Patent Application No. 2009-254141.

* cited by examiner

*Primary Examiner* — Yogesh Aggarwal
*Assistant Examiner* — Shahbaz Nazrul
(74) *Attorney, Agent, or Firm* — Cowan, Liebowitz & Latman, P.C.

(57) ABSTRACT

An image pickup apparatus which has at least an optical zooming function, determines a layout of image data to be picked up by an image pickup unit, and displays the picked-up image data with the determined layout by superimposing the image data with a frame which excludes an image pickup area additionally obtained when an image pickup range corresponding to a focal length for the determined layout is zoomed a predetermined amount in a wide-angle direction.

7 Claims, 9 Drawing Sheets

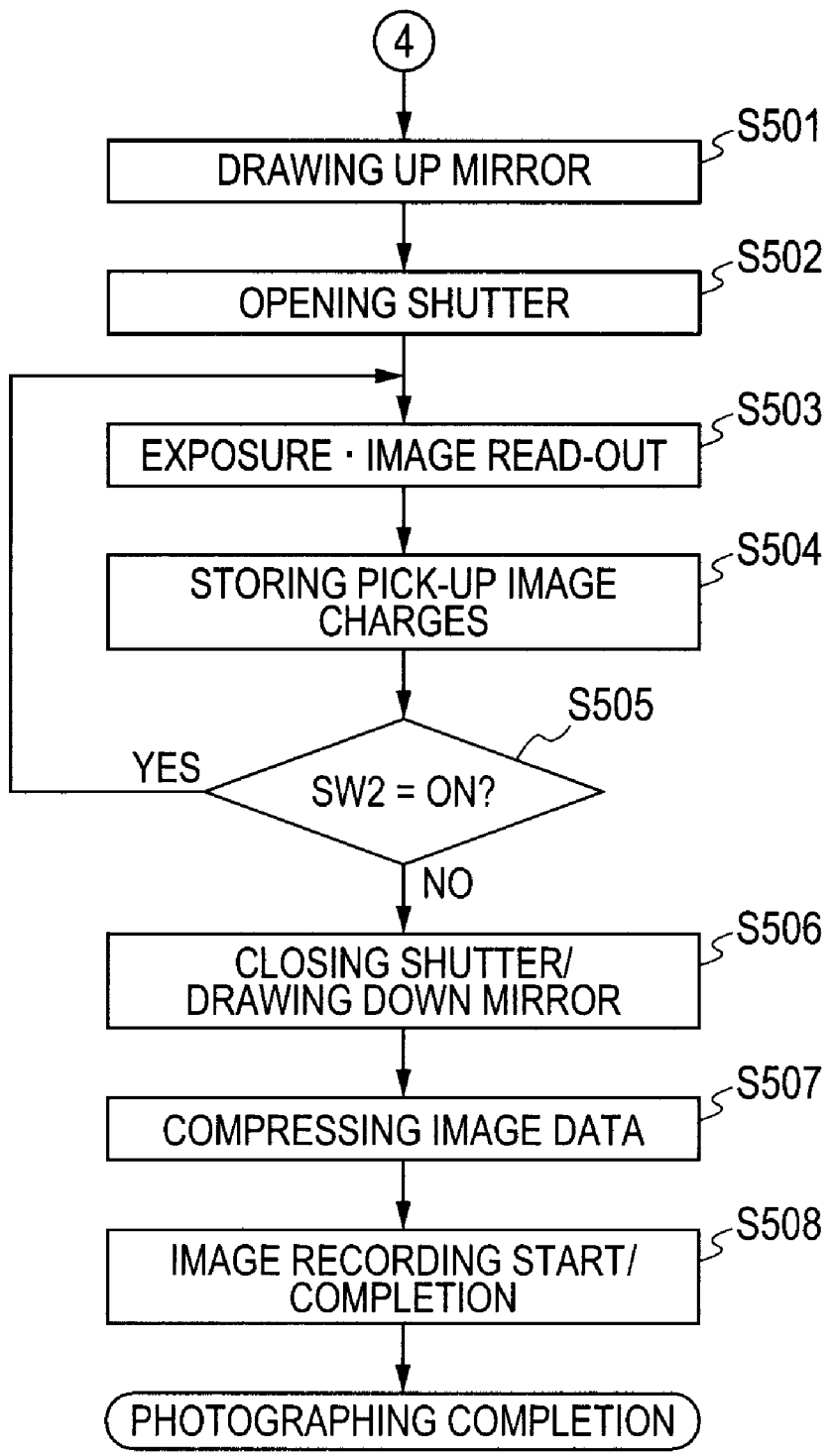

ZOOMING OPERATION
(TELEPHOTO → WIDE-ANGLE)

ZOOMING OPERATION
(TELEPHOTO → WIDE-ANGLE)

OPTICAL ZOOMING
(TELEPHOTO → WIDE-ANGLE)

ENLARGING AND DISPLAYING

IMAGE PICKUP APPARATUS, CONTROL METHOD THEREOF, AND PROGRAM

BACKGROUND OF THE INVENTION

1. Field of the Invention

The present invention relates to a technique for an image pickup apparatus with a zooming function.

2. Description of the Related Art

A technique is known which sets up a high speed continuous photographing mode and cuts out and reads image data only from part of pixels of an image pickup element (see, for example, Japanese Patent Application Laid-Open No. 2001-94855). The technique reduces read time required to read image data from the image pickup element compared to when image data is read out of an entire pixel area, thereby enabling high speed continuous photography which captures object movement in an instant.

However, with the conventional technique described above, it is not easy to understand relationship between an area on a display unit, which corresponds to the pixel area to be cut out, and a focal length. Also, it requires technical skills to fit an object image in a cut-out area for an image data.

It is an aspect of the present invention to attain that a user can easily check a relationship between the area (frame) on a display unit, which corresponds to an image pickup range to be cut out, and a focal length.

SUMMARY OF THE INVENTION

With the present invention, image data with a determined layout is displayed by being superimposed with a frame which excludes an image pickup area additionally obtained when an image pickup range corresponding to a focal length for the determined layout is zoomed a predetermined amount in a wide-angle direction.

According to the present invention, a user can easily check relationship between that area (frame) on a display unit, which corresponds to an image pickup range to be cut out, and a focal length, and also is notified when the focal length changed by zooming to the wide-angle direction coincides with the focal length for the determined layout. Consequently, an object image can be placed within the displayed frame simply and easily. Also, with the present invention, since the image displayed in the frame is enlarged at a point of the notification, the object image can be placed within the displayed frame more simply and easily without fail.

Further features of the present invention will become apparent from the following description of exemplary embodiments with reference to the attached drawings.

BRIEF DESCRIPTION OF THE DRAWINGS

FIG. 5 is a flowchart illustrating an image pickup operation, and in particular a high speed continuous photographing method, in high speed continuous photographing mode according to the first embodiment of the present invention.

DESCRIPTION OF THE EMBODIMENTS

Preferred embodiments of the present invention will now be described in detail in accordance with the accompanying drawings.

Exemplary embodiments of the present invention will be described in detail below with reference to the accompanying drawings. However, it should be noted that the embodiments described below are not intended to limit the present invention. Also, a combination of all the features described in the embodiments is not absolutely necessary for the present invention.

First Embodiment

Figure 1:
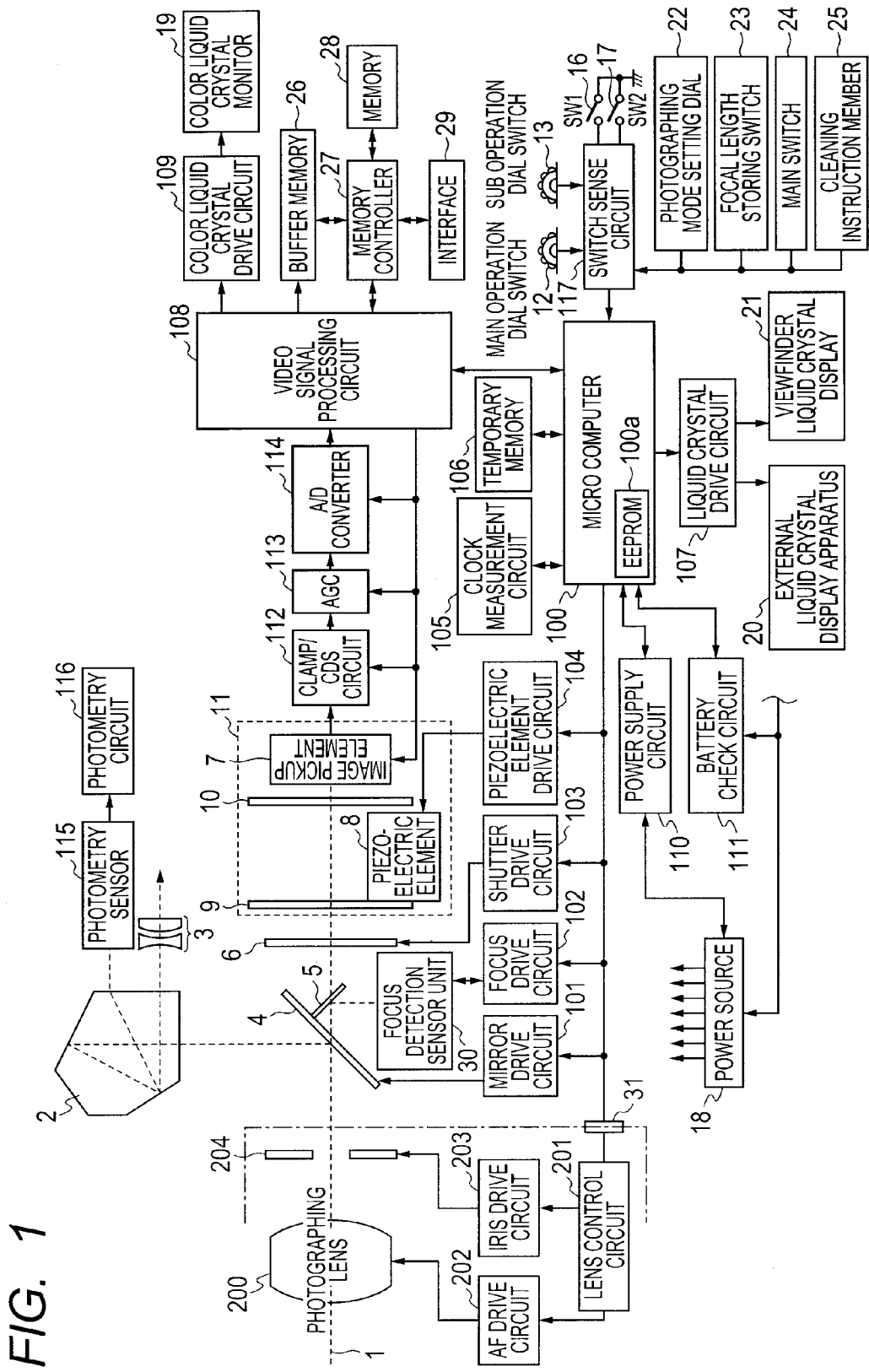
FIG. 1 is a block diagram illustrating major components of a single lens reflex digital camera according to an embodiment of the present invention.

FIG. 1 is a block diagram illustrating major components of a single lens reflex digital camera with an exchangeable lens according to an embodiment of the present invention. A central processing unit (hereinafter referred to as an MPU) 100, which is a microcomputer, is incorporated in a camera body. The MPU 100 controls operation of the camera by performing various processes and giving various instructions to components of the camera. An EEPROM 100a incorporated in the MPU 100 is capable of storing clocking information from a clock measurement circuit 105 and other information. The MPU 100 is connected with a mirror drive circuit 101, focus drive circuit 102, shutter drive circuit 103, video signal processing circuit 108, switch sense circuit 117 and photometry circuit 116. Also, the MPU 100 is connected with a liquid crystal drive circuit 107, a battery check circuit 111, the clock measurement circuit 105, a power supply circuit 110 and a piezoelectric element drive circuit 104. These circuits operate under the control of the MPU 100.

The MPU 100 communicates with a lens control circuit 201 placed in a photographic lens unit, via a mount contact 31. The mount contact 31 also has a capability to transmit a signal to the MPU 100 when a photographic lens unit is connected. Consequently, the lens control circuit 201 can drive a photographic lens 200 and iris 204 in the photographic lens unit via an AF drive circuit 202 and iris drive circuit 203 by communicating with the MPU 100. Also, according to the present embodiment, the lens control circuit 201 transmits lens's focal length information to the MPU 100 via communications.

In response to an ON signal from a focal length storing switch 23, the MPU 100 receives focal length information from the lens control circuit 201 and stores the focal length information in a temporary memory 106. Incidentally, according to the present embodiment, although the photographic lens 200 is illustrated as being a single lens for the sake of convenience, actually the photographic lens 200 is made up of multiple lens groups.

The AF drive circuit 202 is made up of, for example, a stepping motor, and makes adjustments so as to focus photographing light onto an image pickup element 7 by changing focus lens position in the photographic lens 200 under the control of the lens control circuit 201. The iris drive circuit 203 is made up of, for example, an auto-iris, and is configured to obtain an optical iris value by varying the iris 204 using the lens control circuit 201. According to the present embodiment, it is desirable to use a zoom lens, which is controllable under a zooming operation. Details of zoom lenses are publicly known, and thus description thereof will be omitted.

A quick return mirror 6 guides photographing light passing through the photographic lens 200 to a penta prism 2 and partially transmits and guides the photographing light to a sub mirror 5. The sub mirror 5 guides the transmitted photographing light to a focus detection sensor unit 30. The mirror drive circuit 101 drives the quick return mirror 6 to move it between a position where an object image can be viewed through a viewfinder and a position where the quick return mirror 6 is withdrawn from the photographing light. At the same time, the mirror drive circuit 101 drives the sub mirror 5 to move it between a position where the sub mirror 5 guides the photographing light to the focus detection sensor unit 30 and a position where the sub mirror 5 is withdrawn from the photographing light. Specifically, the mirror drive circuit 101 includes, for example, a DC motor and gear train.

The focus detection sensor unit 30 is a well-known phase-difference focus detection sensor unit made up of a field lens, a reflecting mirror, a secondary focusing lens, an iris and line sensors, arranged in the neighborhood of a focal plane (not shown), where the line sensors are made of CCDs. A signal which is output from the focus detection sensor unit 30 is supplied to the focus drive circuit 102, converted into an object image signal, and transmitted to the MPU 100. Based on the object image signal, the MPU 100 performs calculations for focus detection using a phase difference detection method. Then, the MPU 100 determines a defocus amount and defocus direction, and then drives the focus lens in the photographic lens 200 to an in-focus position via the lens control circuit 201 and AF drive circuit 202 based on the defocus amount and defocus direction.

The penta prism 2 is an optical member which reflects the photographing light reflected by the quick return mirror 4 and thereby converts an object image into an erect real image. The user can view the object image through a viewfinder eyepiece window 3 via a viewfinder optical system. The penta prism 2 also guides part of the photographing light to a photometry sensor 115. The photometry circuit 116 converts output from the photometry sensor 115 into luminance signals of individual areas on a viewing surface and outputs the luminance signals to the MPU 100. The MPU 100 calculates an exposure value from the luminance signals thus obtained.

A mechanical focal plane shutter 6 shuts out the photographing light when the photographer is observing the object image through the viewfinder. During photography, the focal plane shutter 6 provides a desired exposure time based on a difference between operating times of a front blade group and rear blade group (neither is shown) in response to a release signal. The focal plane shutter 6 is controlled by the shutter drive circuit 103 on instructions from the MPU 100.

The image pickup element 7 may be, for example, a CMOS which is an image pickup device. Various types of image pickup device are available including CCD, CMOS and CID, and any of the types may be used. Light to which an area of an image pickup field of view of the image pickup element 7 is exposed is picked up.

A clamp/CDS (correlated double sampling) circuit 112 performs basic analog processing prior to A/D conversion and is capable of changing a clamp level. An AGC (automatic gain control) circuit 113 performs basic analog processing prior to A/D conversion and has a function of changing a basic AGC level. An A/D converter 114 converts an analog output signal of the image pickup element 7 into a digital signal.

An infrared ray cut filter 9 has an approximately rectangular shape and cuts off unnecessary infrared light from a light flux incident on the image pickup element 7. Also, a surface of the infrared ray cut filter 9 is covered with conductive material to prevent adhesion of foreign matter.

An optical low-pass filter 10, which has an approximately rectangular shape, is produced by laminating a stack of double refraction plates and phase plates made of quartz or the like. The optical low-pass filter 10 separates the light flux incident on the image pickup element 7 into multiple beams and thereby reduces generation of false resolution signals and false color signals effectively.

A vibrating member 8, which is a piezoelectric element in the present embodiment, vibrates the optical low-pass filter 10. The piezoelectric element 8 is configured to be vibrated by the piezoelectric element drive circuit 104 upon instructions from the MPU 100 so that the infrared ray cut filter 9 vibrates together with the piezoelectric element 8. The optical low-pass filter 10, infrared ray cut filter 9, piezoelectric element 8 and image pickup element 7 have been combined into an image pickup unit 11 together with other components described later.

The video signal processing circuit 108 performs image processing in general, including gamma/knee processing, filtering, and information synthesization for monitor display, on digitized image data. The image data for monitor display received from the video signal processing circuit 108 is displayed on a color liquid crystal monitor 19 via a color liquid crystal drive circuit 109.

Also, the video signal processing circuit 108 can store the image data in a buffer memory 26 via a memory controller 27 on instructions from the MPU 100. Furthermore, the video signal processing circuit 108 has a function of performing JPEG and other image data compression processes. When photographs are taken continuously such as in the case of continuous photography, the video signal processing circuit 108 can store image data in the buffer memory 26 once and then read unprocessed image data in sequence via the memory controller 27. Consequently, the video signal processing circuit 108 can perform image processing including a compression process in sequence regardless of an input rate of image data from the A/D converter 114.

The memory controller 27 has a function of storing the image data input from an external interface 29 in a memory 28. Also, the memory controller 27 has a function of outputting image data from the memory 28 via the external interface 29. The memory 28 may be a flash memory detachable from the camera body.

The switch sense circuit 117 transmits an input signal to the MPU 100 according to operating status of each switch. A first switch 16 is activated on a first stroke (half depression) of a shutter button. A second switch 17 is activated on a second stroke (full depression) of the shutter button. When the second switch 17 is activated, the MPU 100 is directed to start photographing. The switch sense circuit 117 is connected with a main operation dial switch 12, sub operation dial switch 13, photographing mode setting dial 22, main switch 24, cleaning instruction member 25 and focal length storing switch 23.

A liquid crystal drive circuit 107 drives an external liquid crystal display apparatus 20 and viewfinder liquid crystal display 21 according to instructions from the MPU 100. A battery check circuit 111 checks batteries for a predetermined time in response to a signal from the MPU 100 and transmits detection results to the MPU 100. A power source 18 supplies necessary power to various components of the camera. The clock measurement circuit 105 measures time or dates from when the main switch 24 is turned off until the main switch 24 is turned on the next time. On instructions from the MPU 100, the clock measurement circuit 105 can transmit measurement results to the MPU 100.

Figure 2:
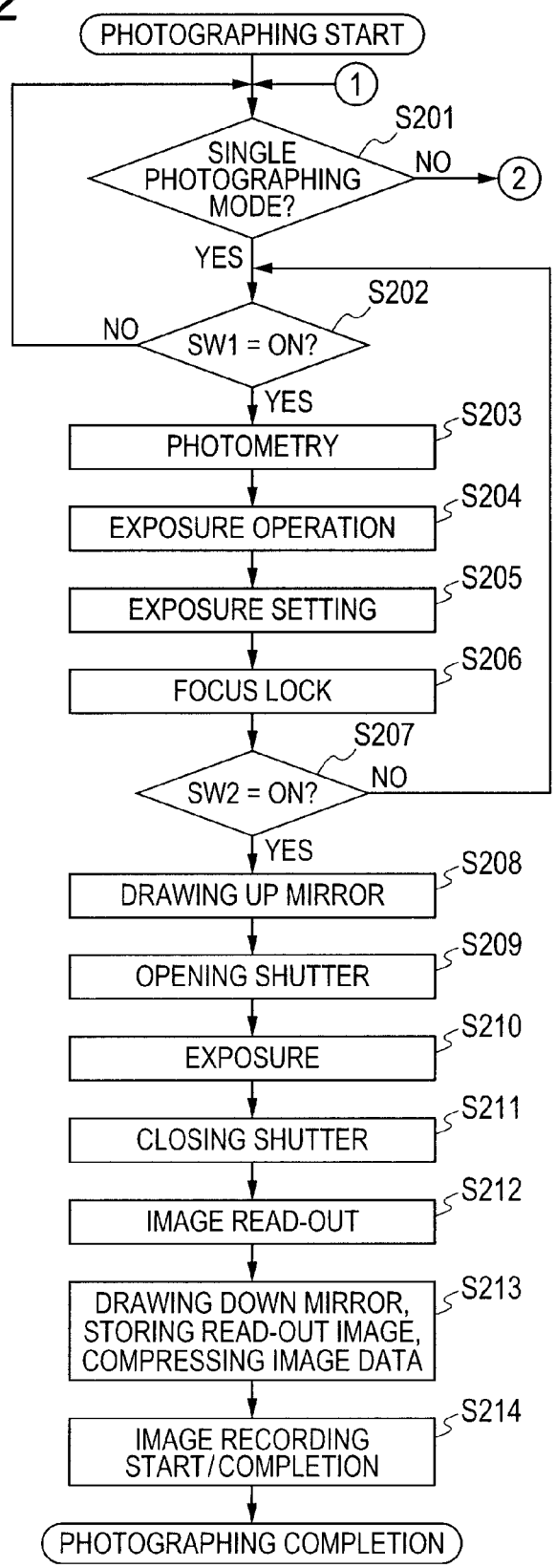
FIG. 2 is a flowchart illustrating an image pickup operation in single photographing mode of the camera illustrated in FIG. 1.

Next, image pickup operation of the single lens reflex digital camera according to the present embodiment will be described. FIG. 2 is a flowchart illustrating an image pickup operation in single photographing mode. In S201, the MPU 100 determines whether the camera is in single photographing mode or another mode. If the camera is in single photographing mode, the MPU 100 determines in S202 whether or not the first switch 16 to be activated on the first stroke of the shutter button is on. On the other hand, if the camera is in a mode other than the single photographing mode, the MPU 100 goes to S301 in FIG. 3 described later.

In S203, the photometry circuit 116 measures object brightness BV. In S204, the MPU 100 carries out exposure calculations based on measurement results of the object brightness BV. In S205, based on results of the exposure calculations, the MPU 100 determines a shutter speed and iris value using a known program diagram (not shown). In S206, the MPU 100 prohibits the lens from being driven. In S207, the MPU 100 determines whether or not the second switch 17 to be activated on the second stroke of the shutter button is on.

In S208, the mirror drive circuit 101 drives the quick return mirror 4 to a position where the mirror 4 is withdrawn from the photographing light. Hereinafter this drive operation will be referred to as a mirror-up operation. In S209, the front blade group (not shown) of the mechanical focal plane shutter 6 operates to expose the image pickup element 7 in the area of the image pickup field of view. In S210, exposure takes place. The image pickup element 7 accumulates charges as a result of the exposure. In S211, the rear blade group (not shown) of the mechanical focal plane shutter 6 operates to block light from entering the image pickup element 7. In S212, the charges accumulated in the image pickup element 7 are read out. In S213, the mirror drive circuit 101 returns the quick return mirror 4 to a position where the object image can be viewed through the viewfinder. Hereinafter this drive operation will be referred to as a mirror-down operation. Also, the video signal processing circuit 108 stores the image data read out in S212 in the buffer memory (charge storage) and performs an image data compression process (image compression) using JPEG or the like. In S214, the memory controller 27 records the compressed image data in the memory 28 (image recording). Once the image recording is complete, the photographing is completed.

Figure 3:
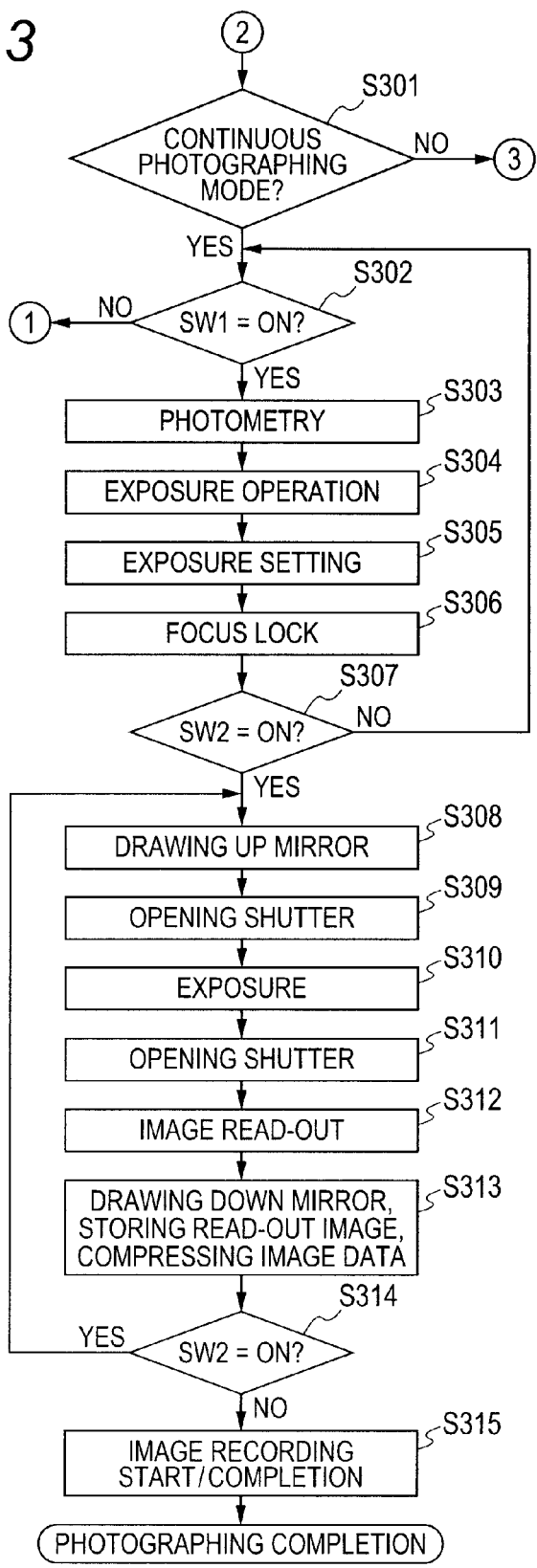
FIG. 3 is a flowchart illustrating an image pickup operation in continuous photographing mode of the camera illustrated in FIG. 1.

FIG. 3 is a flowchart illustrating an image pickup operation in continuous photographing mode. If it is determined in S201 in FIG. 2 that the camera is in a mode other than the single photographing mode, the MPU 100 goes to the image pickup operation in continuous photographing mode illustrated in FIG. 3. In S301, the MPU 100 determines whether the camera is in continuous photographing mode or another mode. If it is determined that the camera is in continuous photographing mode, the MPU 100 goes to S302 and subsequent steps. If it is determined that the camera is in a mode other than the continuous photographing mode, the MPU 100 goes to S401 and subsequent steps in FIG. 4. The image pickup operation in S302 to S313 are the same as the image pickup operation in S202 to S213 in the single photographing mode, and thus description thereof will be omitted. In S314, the MPU 100 determines whether or not the second switch 17 to be activated on the second stroke of the shutter button is on. If the second switch 17 is on, the MPU 100 returns to S308 since it is assumed that continuous photography is going on. On the other hand, if the second switch 17 is off, the MPU 100 determines in S315 that the continuous photography has been finished, and consequently the memory controller 27 records the image data compressed by image compression in the memory 28 (image recording). Once the image recording is complete, the photographing is completed.

Figure 4:
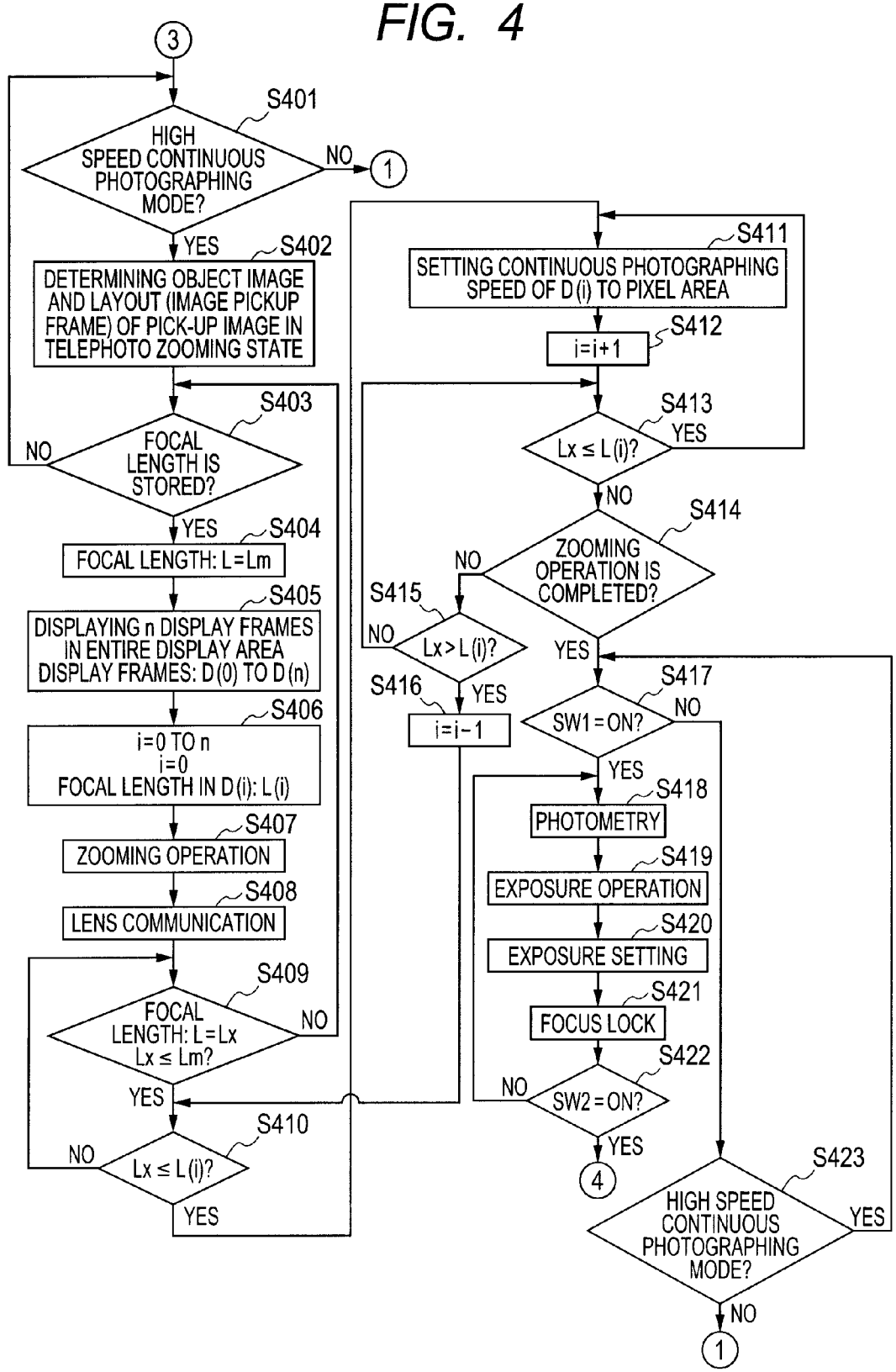
FIG. 4 is a flowchart illustrating an image pickup operation, and in particular a display frame display method and enlargement method, in high speed continuous photographing mode according to a first embodiment of the present invention.

Next, operation of the single lens reflex digital camera according to the present embodiment in high speed continuous photographing mode will be described. FIG. 4 is a flowchart illustrating a photographing operation, and in particular display method and enlargement method of a display frame, in high speed continuous photographing mode. According to the present embodiment, it is desirable to use a zoom lens capable of optically varying an angle of view of photographing and select such an angle of view for photography that is available at a focal length at least equal to or larger than the minimum focal length of the zoom lens. If it is determined in S301 in FIG. 3 that the camera is in a mode other than the continuous photographing mode, the MPU 100 goes to the photographing operation in high speed continuous photographing mode illustrated in FIG. 4.

In S401, the MPU 100 determines whether or not the camera is in high speed continuous photographing mode. If the camera is not in high speed continuous photographing mode, the MPU 100 returns to S201 in FIG. 2. On the other hand, if the camera is in high speed continuous photographing mode, MPU 100 goes to S402. In S402, the MPU 100 determines a layout (image pickup frame) of the object and background in the photographic image in response to an action of the photographer. In S403, the MPU 100 determines whether or not focal length information is stored in the temporary memory 106 in response to an action of the photographer. The focal length information is stored by the photographer. Regarding a setting method for that, a dedicated switch for focal length storage operation may be used, or a switch which also serves other purposes may be provided on an exterior of the image pickup apparatus. According to the present embodiment, the focal length information is stored when the focal length storing switch 23 is turned on by the photographer.

In S404, the MPU 100 replaces the stored focal length information L with a variable Lm. Storing Lm is substantially equivalent to storing the image pickup frame determined in S402. In S405, the video signal processing circuit 108 displays multiple (n) display frames in an entire display area on the color liquid crystal monitor 19. According to the present embodiment, two display frames, such as a1 and a2 in FIG. 6 described later, are displayed in addition to the entire display area a0. The display frames correspond to the focal length information Lm which has replaced in S404 and are displayed by being superimposed on a picked-up image displayed in the entire display area. Each of the multiple display frames corresponds to a subarea to which image data is output from the image pickup element 7 when a photograph is taken at a corresponding continuous photographing speed. Specifically, in FIG. 6, the entire display area a0 corresponds to an area to which image data is output from the image pickup element 7 when a photograph is taken at 5 f/sec. The display area a1 corresponds to an area to which image data is output from the image pickup element 7 when a photograph is taken at 10 f/sec. The display area a2 corresponds to an area to which image data is output from the image pickup element 7 when a photograph is taken at 15 f/sec.

Now, a method for determining a range for a display frame will be described. The range for a display frame may be determined based on the continuous photographing speed, data amount of a picked-up image, range of an object desired to be captured, or the like. According to the present embodiment, a method for determining the range for a display frame based on the continuous photographing speed will be described.

If longitudinal and lateral sizes of the image pickup element 7 are (Xf,Yf), i.e., Xf=24 mm, Yf=36 mm in the case of a 35-mm image pickup element, the MPU 100 sets the longitudinal and lateral sizes of the image pickup element 7 corresponding to the image pickup frame based on the focal length information Lm stored in S404 to (Xm,Ym). Hereinafter, the longitudinal and lateral sizes of the image pickup element 7 will be referred to as an image pickup area. Immediately after the focal length information is stored in S403, normally Xm=Xf, Ym=Yf. If it is assumed that the focal length has been moved to L(i) on the wide-angle side by a zooming operation, an image pickup area (X(i),Y(i)), which is the image pickup area (Xm,Ym) after the move on the wide-angle side, is calculated using Eqs. (1) and (2) described below. In the image pickup area (X(i),Y(i)), zoom magnification at the focal length information L(i) to the focal length information Lm is Z(i)=L(i)/Lm. Then, the image pickup area (X(i),Y(i)) is given by $$X(i)=i\sqrt{Z(i)} \times Xm \qquad (1)$$

$$Y(i)=i\sqrt{Z(i)} \times Ym \qquad (2)$$

The display frame is a frame which corresponds to the image pickup area (X(i),Y(i)) of the image pickup element 7 and which is displayed in the entire display area. If the focal length L(i) is outside a variable focal length range of the mounted lens, desirably the display frame is not displayed. If the total number of pixels of the image pickup element 7 is denoted as Gf and the number of pixels in the image pickup area (X(i),Y(i)) of the image pickup element 7 is denoted as G(i), then G(i) is given by $$G(i)=Z(i) \times Gf \qquad (3)$$

In the high speed continuous photographing mode, the continuous photographing speed is inversely proportional to charge read-out time of the image pickup element 7. Therefore, if the continuous photographing speed when charges are read out from all the pixels in the image pickup element 7 as image data is Vf and the continuous photographing speed when charges are read out from the image pickup area (X(i),Y(i)) is V(i) of the image pickup element 7, then V(i) is given by $$V(i)=(1/Z(i)) \times Vf \qquad (4)$$

The image pickup area is determined by calculating the continuous photographing speed using Eqs. (1) to (4) and a corresponding range of the display frame is determined. If it is assumed that a 35-mm image pickup element 7 is used such as illustrated in FIG. 6 which will be described later and that a display frame a1 is calculated, which display frame will double the continuous photographing speed from Vf=5 to V(a1)=10, then Z(a1)=½ from Eq. (4). If the image pickup area is (Xm=Xf, Ym=Yf), from Eqs. (1) and (2), the range (X(a1),Y(a1)) of the display frame a1 is expressed as follows.

$$X(a1)=i\sqrt{2} \times Xf$$

$$Y(a1)=i\sqrt{2} \times Yf$$

Hereinafter, for convenience of explanation, the image pickup area and the range of the display frame are assumed to be equivalent and referred to collectively as the range of the display frame. In S406, the MPU 100 initializes the variable i (integer) to 0. According to the present embodiment, variables which change in accordance with the variable i includes the corresponding display frame D(0 to n), focal length L(0 to n) corresponding to the display frame, range of the display frame (X(0 to n),Y(0 to n)), and zoom magnification Z(0 to n). For the sake of convenience, it is defined that the display frame D(i) stores the focal length L(i), range of the display frame (X(i),Y(i)), and zoom magnification Z(i). In S407, an optical zooming operation is performed by the photographer. Normally, with a single lens reflex camera, the optical zooming operation is performed by rotating a zoom ring attached to the lens.

In S408, the focal length information changed as a result of the optical zooming operation in S407 is transmitted from the lens to the camera body through constant communications between the MPU 100 and the lens control circuit 201 in the photographic lens unit via the mount contact 31 if the focal length information is stored in high speed continuous photographing mode in S403. Consequently, the camera body can acquire the focal length information. In S409, the MPU 100 determines whether the focal length information Lx resulting from the optical zooming operation is on the wide-angle side or on the telephoto side compared to the focal length information Lm stored in S403. If the focal length information Lx is on the wide-angle side, then Lx≦Lm. Lx represents the focal length which results when the focal length L is changed by the optical zooming operation in S407. The focal length Lx is constantly monitored in S408 and communicated to inside the camera. If Lx>Lm, high speed continuous photography is not possible with the image pickup frame determined in S402, and thus the MPU 100 returns to S403.

In S410, the MPU 100 determines whether or not relationship between the focal length Lx resulting from the zooming operation and the focal length L(i) corresponding to the display frame displayed in S405 satisfies Lx≦L(i). If it is determined in S410 that Lx≦L(i), the MPU 100 changes settings in S411 so as to pick up images at a continuous photographing speed corresponding to the display frame D(i). The continuous photographing speed corresponding to the display frame D(i) is the continuous photographing speed calculated in S405 from the focal length L(i), range of the display frame (X(i),Y(i)) and zoom magnification Z(i) stored in the display frame D(i).

In S412, the MPU 100 updates a state variable i to i+1. In S413, the MPU 100 determines whether or not the relationship between the focal length Lx resulting from the zooming operation and the focal length L(i) corresponding to the display frame displayed in S405 satisfies Lx≦L(i). If Lx≦L(i), the MPU 100 returns to S411. If Lx≦L(i) is not satisfied (i.e., if Lx>L(i)), the MPU 100 goes to S414. In S414, the MPU 100 determines whether or not the photographer has completed the zooming operation. If the zooming operation has not been completed, the MPU 100 goes to S415 to determines whether Lx>L(i). If it is determined that Lx>L(i), the MPU 100 goes to S416. In S416, the MPU 100 changes the state variable i to i−1. On the other hand, if Lx>L(i) is not satisfied (i.e., if Lx≦L(i)), the MPU 100 returns to S413.

If it is determined in S414 that the zooming operation has been completed, the MPU 100 determines in S417 whether or not the first switch 16 to be activated on the first stroke of the shutter button is on. If the first switch 16 is not on, the MPU 100 goes to S423 to check again whether or not the camera is in high speed continuous photographing mode. If the camera is in high speed continuous photographing mode, the MPU 100 returns to S417. On the other hand, if the camera is not in high speed continuous photographing mode, the MPU 100 returns to S201 in FIG. 2. If it is determined in S417 that the first switch 16 is on, the MPU 100 determines to pick up images in the pixel area of the image pickup element 7 corresponding to the display frame D(i) at the continuous photographing speed corresponding to the display frame D(i). Then, the MPU 100 goes to S418. S418 to S421 are the same as the image pickup operation in the single photographing mode, and thus redundant description thereof will be omitted. In S422, the MPU 100 determines whether or not the second switch 17 is on. If the second switch 17 is on, the MPU 100 goes to a process in FIG. 5 described later. On the other hand, if the second switch 17 is not on, the MPU 100 returns to S418.

The operation in S401 to S422 makes it simple and easy for the photographer to place the object in the display frame, allowing the photographer to simply and easily change photographic settings such as the continuous photographing speed, recording size of images to be picked up, range of the display frame in any scene while tracking the object.

FIG. 5 is a flowchart illustrating an image pickup operation, and in particular, a high speed continuous photographing method, in high speed continuous photographing mode. S501 and S502 are the same as the image pickup operation (S208 and S209) in the single photographing mode, and thus redundant description thereof will be omitted. On the other hand, S503 to S506 will be described with reference to FIGS. 7A and 7B for the sake of convenience.

Figure 7A:
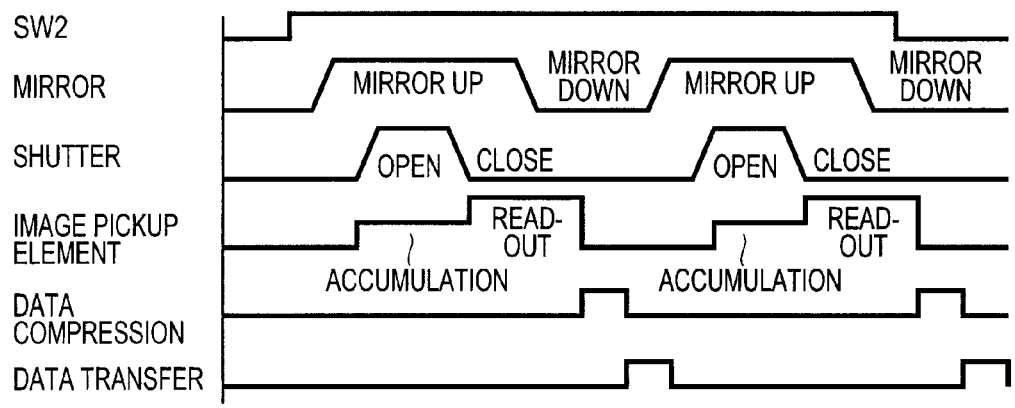
FIG. 7A is a diagram illustrating an operation sequence in continuous photographing mode.

FIG. 7A illustrates an operation sequence (timing chart) in continuous photographing mode. In response to a signal from the second switch 17, the mirror (quick return mirror 4) is drawn up and consequently the front blade group (not shown) of the mechanical focal plane shutter 6 operates, allowing the image pickup element 7 to be exposed in the area of the image pickup field of view. As the front blade group (not shown) of the mechanical focal plane shutter 6 operates, the image pickup element 7 starts accumulation. When the rear blade group (not shown) of the mechanical focal plane shutter 6 completes operation, the image pickup element 7 completes accumulation and reading-out is started (this relates to image pickup speed). When the reading-out is completed, the image data is compressed and transferred.

Figure 7B:
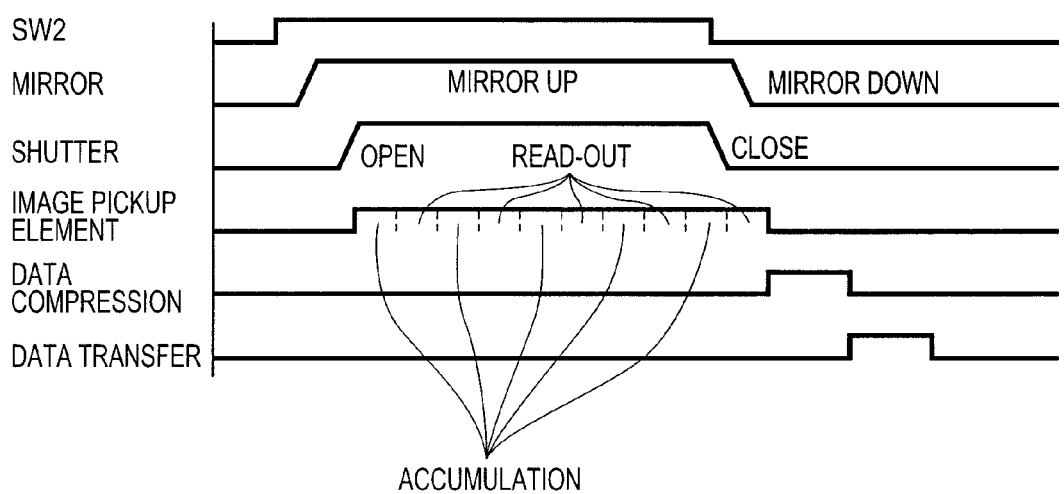
FIG. 7B is a diagram illustrating an operation sequence in high speed continuous photographing mode.

FIG. 7B illustrates an operation sequence in high speed continuous photographing mode. In response to a signal from the second switch 17, the mirror (quick return mirror 4) is drawn up and consequently the front blade group (not shown) of the mechanical focal plane shutter 6 operates, allowing the image pickup element 7 to be exposed in the area of the image pickup field of view. As the front blade group (not shown) of the mechanical focal plane shutter 6 operates, the image pickup element 7 starts accumulation.

Accumulation time (i.e. image pickup speed) varies with the shutter speed, and the shutter speed in high speed continuous photographing mode is controlled such that the accumulation time and read-out time will be equivalent even at the lowest shutter speed. Unlike the sequence in the continuous photographing mode, although the image pickup element 7 starts reading upon completion of accumulation, the rear blade group (not shown) of the mechanical focal plane shutter 6 does not come into operation even after the reading is completed and accumulation and reading are repeated.

In response to an OFF signal from the second switch 17, the image pickup element 7 completes accumulation and reading, followed by a data compression operation, data transfer operation, operation of the rear blade group (not shown) of the mechanical focal plane shutter 6, and mirror-down operation of the quick return mirror 4. In S503, the image pickup element 7 is exposed. In this case, the image pickup element 7 accumulates and reads out charges only within the range of the display frame corresponding to the continuous photographing speed.

In S504, the MPU 100 stores (memorizes) the image data read out in the buffer memory 26. In S505, the MPU 100 determines whether or not the second switch 17 to be activated on the second stroke of the shutter button is on. If the second switch 17 is on, the MPU 100 returns to S503. On the other hand, if the second switch 17 is off, the MPU 100 goes to S506. S506 to S508 are the same as the image pickup operation (S213 and S214) in the single photographing mode, and thus redundant description thereof will be omitted.

Figure 6A:
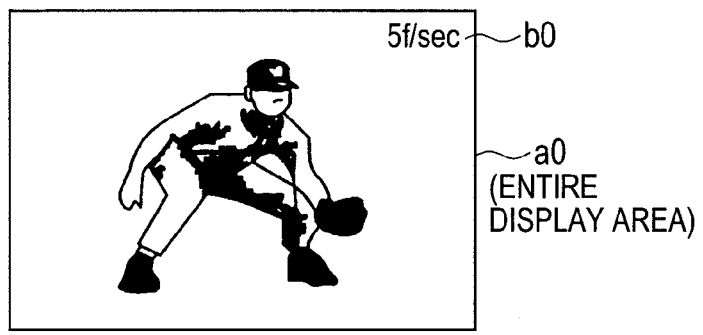
FIGS. 6A, 6B, 6C and 6D are diagrams illustrating display examples used for checking by a photographer in high speed continuous photographing mode.
Figure 6B:
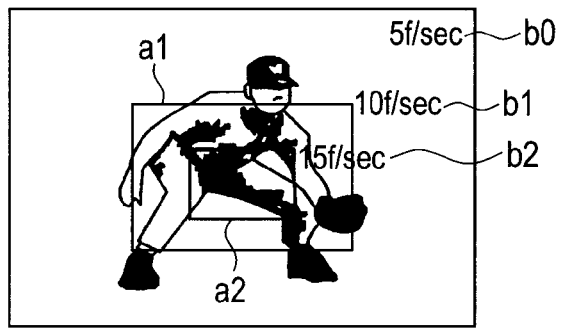
Figure 6C:
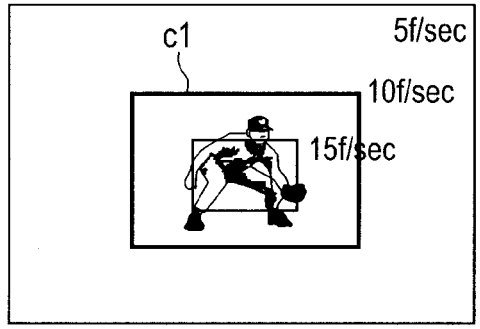
Figure 6D:
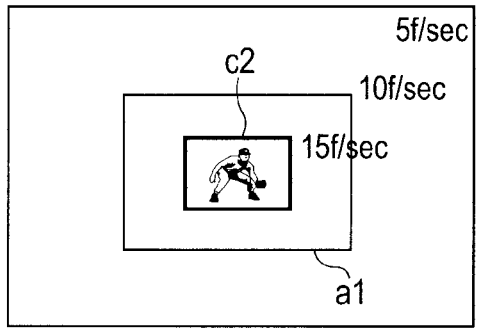

FIGS. 6A to 6D are diagrams illustrating display examples used for checking by a photographer in high speed continuous photographing mode. In the single photographing/continuous photographing mode, the display frame is not displayed as illustrated in FIG. 6A. FIG. 6B illustrates a display presented after the photographer enters the high speed continuous photographing mode, determines a layout of an object and background in an image to be picked up, and determines a final coverage area (image pickup frame) for main photography. The display frames a1 and a2 corresponding to respective continuous photographing speeds are displayed by being superimposed on image data as denoted with b1 and b2. Two display frames are illustrated for the sake of convenience. FIG. 6C illustrates a display presented the moment the focal length L1 corresponding to the display frame a1 and the focal length Lx resulting from a zooming operation coincide with each other as the photographer performs the zooming operation. If L1≧Lx at this point of time, the setting of continuous photographing speed is switched to 10 f/sec so as to record only the pixel area of the image pickup element 7 corresponding to the display frame a1. Also, thickness of frame lines of the display frame is changed as indicated by c1 to inform the photographer that the focal lengths have been changed to L1≧Lx as a result of the zooming operation. Incidentally, the method for informing the photographer that the focal lengths have been changed to L1≧Lx is not limited to the one exemplified by c1. FIG. 6D illustrates a display presented the moment the focal length L2 corresponding to the display frame a2 and the focal length Lx resulting from a zooming operation coincide with each other as the photographer performs the zooming operation. If L2≧Lx, the setting of continuous photographing speed is switched to 15 f/sec so as to record only the pixel area of the image pickup element 7 corresponding to the display frame a2. Also, the thickness of the frame lines of the display frame is changed as indicated by c2 to inform the photographer that the focal lengths have been changed to L2 Lx as a result of the zooming operation. Incidentally, the continuous photographing speeds b0, b1 and b2 may be displayed together with the respective display frames a0, a1 and a2. This allows the photographer to grasp the relationship between the display frames and continuous photographing speeds.

According to the present embodiment, image data picked up in a determined final coverage area is displayed by being superimposed with a frame which represents an additional range obtained when an image pickup range available using a focal length for the final coverage area is zoomed a predetermined amount in a wide-angle direction. Thus, the present embodiment makes it easy for the photographer to check relationship between that area (frame) on a display unit which corresponds to an image pickup range to be cut out, and a focal length.

According to the present embodiment, the continuous photographing speed is set to a value corresponding to a display frame by a zooming operation performed, in the wide-angle direction, up to an image pickup area corresponding to the display frame. This allows the photographer to change the display frame and continuous photographing speed by simply performing a zooming operation and thereby change settings of the display frame and continuous photographing speed simply and easily while tracking the object. Thus, the photographer can photograph at an appropriate continuous photographing speed using an appropriate display frame in any scene.

Also, according to the present embodiment, multiple display frames are displayed for multiple continuous photographing speeds. Thus, the present embodiment allows optimal settings to be selected from the multiple display frames and multiple continuous photographing speeds.

The variable focal length range varies with the type of mounted lens, and available display frames and continuous photographing speeds vary with the focal length range. However, any display frame of a size which is outside a zoom control limit on the wide-angle side is not displayed according to the present embodiment. This alerts the photographer of display frames and continuous photographing speeds unavailable for photographing and thereby preventing misoperations.

Second Embodiment

Next, a second embodiment of the present invention will be described with reference to FIGS. 8 and 9. The present embodiment includes a variation of the display configuration of the display frame according to the first embodiment. The rest of the configuration is the same as the first embodiment. Therefore, only differences from the first embodiment will be described and description of the same components as the first embodiment will be omitted. In this connection, in FIGS. 8 and 9, the same components as those in the first embodiment are denoted by the same reference numerals as the corresponding components in the first embodiment.

According to the present embodiment, in making settings in S411 in FIG. 4 to record only the image data in the display frame a1, the display method for the frame a1 has been changed. Whereas in the first embodiment, the display frame is shown in thick lines, for example, as shown in FIG. 6C to notify the photographer of the settings, in the present embodiment, the frame a1 is displayed in enlarged form as shown in FIG. 9D later.

Figure 8:
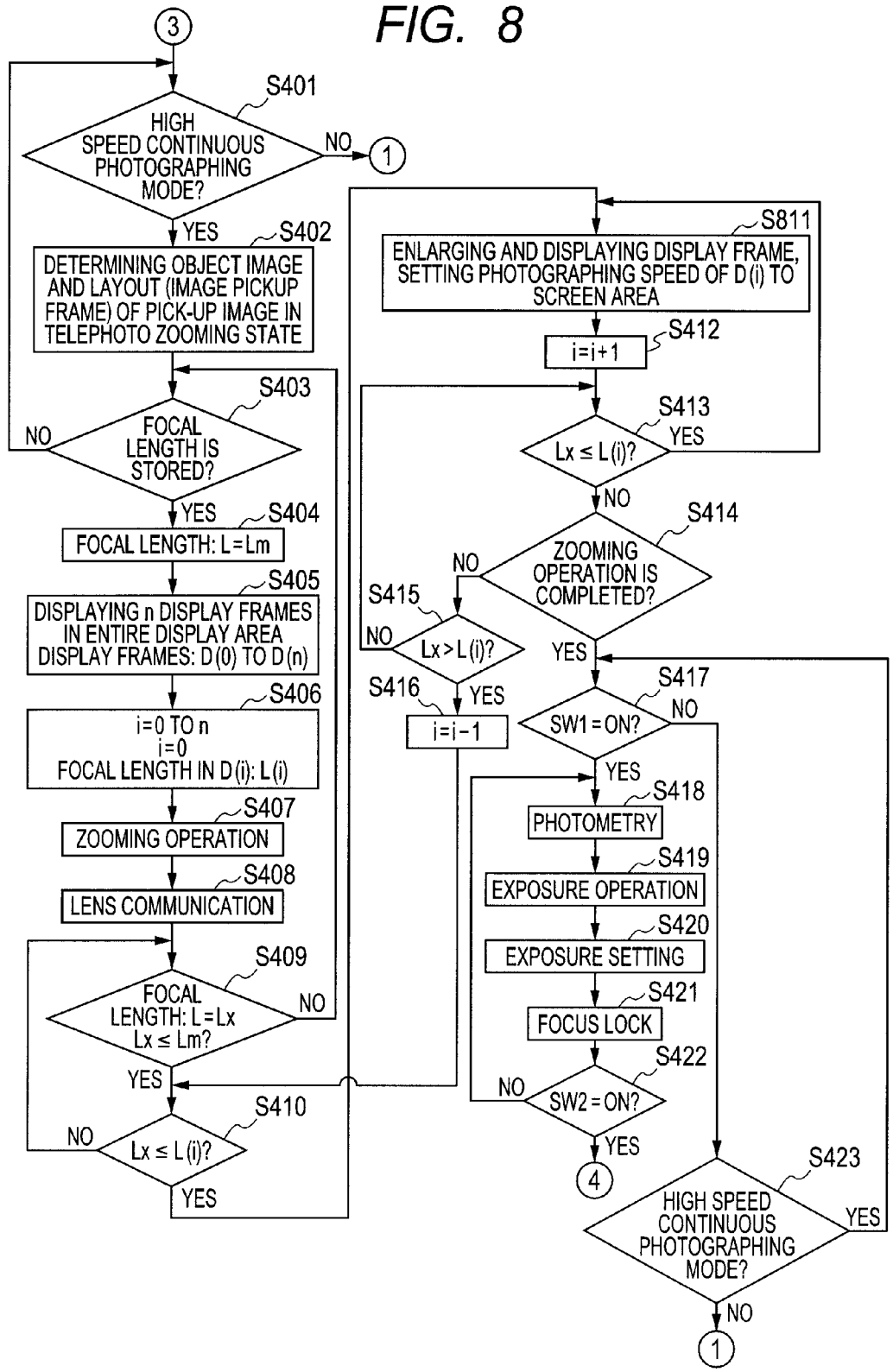
FIG. 8 is a flowchart illustrating a photographing operation, and in particular a display frame display method and enlargement method, in high speed continuous photographing mode according to a second embodiment of the present invention.

If it is determined in S410 in FIG. 8 that $Lx \leq L(i)$, the MPU 100 displays the display frame in enlarged form by digital zoom control in S811. While the enlarged display may be created either via digital zoom control by the photographer or automatically based on the determination in S410, in the present embodiment, the latter method is used, i.e., the enlarged display is created automatically based on the determination in S410. Desirably an enlargement ratio of $1/Z(i)$ is used. That is, it is desirable to enlarge the image data in the display frame to exclude an image pickup area introduced in the image pickup range by the zoom control involving optical zooming to the wide-angle side.

However, when the display frame is enlarged using this enlargement ratio, the display frame normally extends to the entire display area. Consequently, what has been shown in the display area until just before the enlargement suddenly falls outside the display area, which may cause some photographers to feel odd. Although an enlargement ratio of $1/Z(i)$ is used in the present embodiment, the enlargement ratio is not limited to $1/Z(i)$, and a value smaller or larger than $1/Z(i)$ may be used.

Figure 9A:
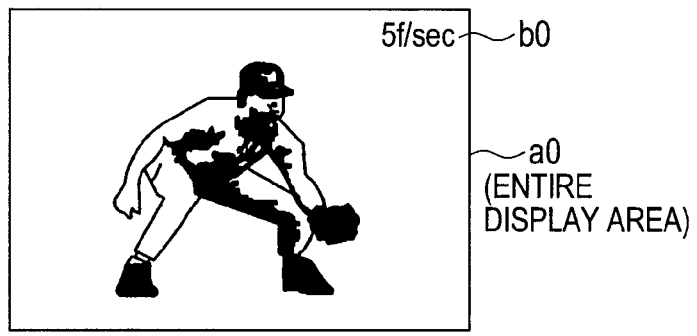
FIGS. 9A, 9B, 9C, and 9D are diagrams illustrating displays used for checking by a photographer in high speed continuous photographing mode according to the second embodiment of the present invention.
Figure 9B:
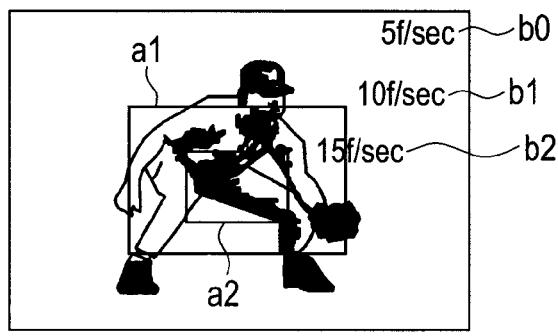
Figure 9C:
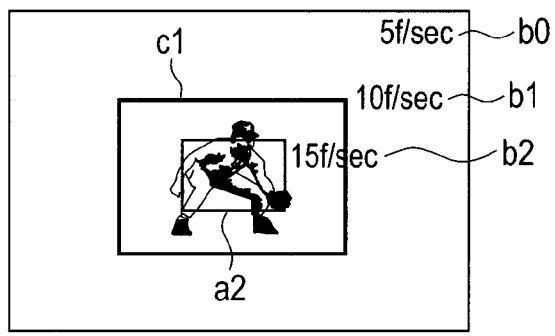
Figure 9D:
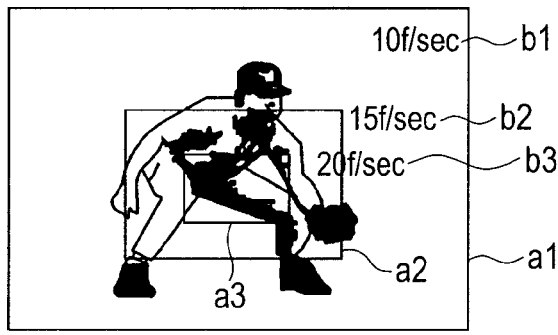

FIGS. 9A to 9D are diagrams for illustrating the enlarged display of the display frame in S811. FIGS. 9A and 9B, which are the same as FIGS. 6A and 6B, illustrate how the photographing mode is switched from the single photographing/continuous photographing mode (FIG. 9A) to the high speed continuous photographing mode and the layout (image pickup frame) of the object and background in the image to be picked up are determined (FIG. 9B). The display frames a1 and a2 corresponding to the respective continuous photographing speeds are displayed as denoted with b1 and b2. Two display frames are shown for the sake of convenience. Also, FIG. 9C, which corresponds to FIG. 6C, illustrates a display presented the moment the focal length L1 corresponding to the display frame a1 and the focal length Lx resulting from a zooming operation coincide with each other as the photographer performs the zooming operation. The setting of continuous photographing speed is switched to 10 f/sec and the display frame a1 is shown in thick lines to indicate that only the pixel area of the image pickup element 7 corresponding to the display frame a1 will be recorded.

FIG. 9D illustrates a display presented the moment the display frame a1 is enlarged in FIG. 9C. After the enlargement, the continuous photographing speed b0 in FIG. 9C is switched to b1 in FIG. 9D. That is, setting changes are made to pick up images at a continuous photographing speed corresponding to the display frame D(i). The continuous photographing speed corresponding to the display frame D(i) is the continuous photographing speed calculated in S405 from the focal length L(i), range of the display frame (X(i),Y(i)) and zoom magnification Z(i) stored in the display frame D(i). Also, the display frame a1 is stretched by enlarged display using digital zooming so as to match the display frame a0 in FIG. 9A, and the frame a2 is also displayed in enlarged form accordingly.

In the enlarged display, since the frame a1 is enlarged to the entire display area a0, a new display frame a3 and new continuous photographing speed b3 may be displayed. This can prevent complication of the display presented when the camera is switched to the high speed continuous photographing mode in FIG. 9B and the layout (image pickup frame) of the object and background in the image to be picked up is determined.

According to the second embodiment described above, in displaying image data with a pickup range enlarged by zoom control involving optical zooming of image data to be picked up to the wide-angle side, image data in the display frame is enlarged by digital zoom control. Consequently, an object image can be placed within the display frame simply and easily. Also, as multiple display frames are displayed for multiple continuous photographing speeds, the photographer can select a display frame corresponding to a desired continuous photographing speed in any scene and change the continuous photographing speed simply and easily while taking hold of the object.

Again, in the present embodiment, any display frame of a size which is outside a zoom control limit of the optical zooming function on the wide-angle side is not displayed. The variable focal length range varies with the type of lens, and available display frames and continuous photographing speeds vary with the focal length range. The display using the enlarged display frame according to the present embodiment also alerts the photographer that continuous photographing speeds corresponding to hidden display frames are unavailable for photographing and thereby prevents misoperations.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-210859, filed on Sep. 11, 2009, and 2009-254141, filed on Nov. 5, 2009, which are hereby incorporated by reference herein in their entirety.

What is claimed is:

1. An image pickup apparatus comprising:
   an image pickup unit including an image pickup element;
   a setting unit configured to set a plurality of areas in an image picked up by the image pickup unit, where the each area is set correspondingly to at least one image reading speed at which the image pickup unit is capable of reading out an image in that area from the image pickup element;
   a recording control unit configured to record the picked-up image in the plurality of areas set by the setting unit, on a recording medium; and
   a display control unit configured to display information indicating the plurality of the set areas and information indicating the image reading speed corresponding to the plurality of the set areas by superimposing the information over the image picked up by the image pickup unit.

2. The image pickup apparatus according to claim 1, further comprising a determination unit configured to determine one of the set areas as an area for the picked-up image to be recorded by the recording control unit, based on an image pickup condition of the image pickup unit,
   wherein the display control unit displays information for identifying the area determined by the determination unit.

3. The image pickup apparatus according to claim 2, wherein when the determination unit determines the area to be a recording area of the picked-up image on the basis of the image pickup condition, the image pickup unit sets the image reading speed correspondingly to the determined area.

4. The image pickup apparatus according to claim 2, further comprising an enlargement unit configured to enlarge the picked-up image displayed in the area using digital zoom when the determination unit determines the area to be a recording area of the picked-up image on the basis of the image pickup condition.

5. The image pickup apparatus according to claim 4, wherein when the enlargement unit enlarges the picked-up image displayed in the determined area, the display control unit displays information indicating another of the set areas and information indicating the corresponding image reading speed by superimposing the information over the picked-up image.

6. A method for controlling an image pickup apparatus having an image pickup unit including an image pickup element, the method comprising:
   setting a plurality of areas in an image picked up by the image pickup unit, where each area is set correspondingly to at least one image reading speed at which the image pickup unit is capable of reading out an image in that area from the image pickup element;
   recording the picked-up image in the plurality of areas set by the setting on a recording medium;
   displaying information indicating plurality of the set areas and information indicating the image reading speed corresponding to the plurality of the set areas by superimposing the information over the image picked up by the image pickup unit.

7. A non-transitory computer-readable recording medium storing a program comprising a program code for causing a computer to execute the method according to claim 6.

* * * * *